United States Patent [19]

Christy

[11] 4,162,671

[45] Jul. 31, 1979

[54] SOLAR ENERGY PANEL AND MEDIUM FOR USE THEREIN

[76] Inventor: Donald Christy, 1005 Washington, Scott City, Kans. 67871

[21] Appl. No.: 824,269

[22] Filed: Aug. 15, 1977

[51] Int. Cl.² ............................ F24H 7/00; F24J 3/02
[52] U.S. Cl. ..................................... 126/400; 126/270; 165/104 M; 252/70; 165/DIG. 4
[58] Field of Search ................. 126/270, 271, 400; 237/1 A; 165/104 M, 104 S, 18, DIG. 4; 252/67, 70, 71

[56] References Cited

U.S. PATENT DOCUMENTS

| | | | |
|---|---|---|---|
| 2,052,014 | 8/1936 | Chamberlain | 165/104 S |
| 2,677,367 | 5/1954 | Telkes | 126/270 X |
| 3,314,414 | 4/1967 | Rowekamp | 126/271 |
| 3,356,828 | 12/1967 | Furness | 126/400 X |
| 3,834,456 | 9/1974 | Clarke et al. | 165/104 S |
| 3,955,555 | 5/1976 | Bostrom | 126/270 |
| 4,073,284 | 2/1978 | Laing | 126/400 |

Primary Examiner—James C. Yeung
Attorney, Agent, or Firm—Lowe, Kokjer, Kircher, Wharton & Bowman

[57] ABSTRACT

A solar energy panel and an energy storing medium for use therewith is the subject of the present invention. The solar energy panel comprises a container having a transparent pane and designed to hold an energy storing medium. By utilizing a transparent material the solar radiation is passed directly to the energy absorbing medium thereby increasing the operating efficiency. A novel energy storing medium is also used in the energy panel. This medium comprises a paraffinic or aromatic hydrocarbon having a specific gravity of less than one, a melting point higher than 50° F. and a relatively high heat of fusion. By using an organic compound a medium is provided which has the desired energy storage capability and which is noncaustic and relatively light weight.

11 Claims, 5 Drawing Figures

SOLAR ENERGY PANEL AND MEDIUM FOR USE THEREIN

This invention relates to solar energy generally and, more particularly, to a radiant energy heat transfer and storage medium, and to the method of utilizing same.

Energy from the sun reaches the earth as electromagnetic radiation which can be absorbed by suitable surfaces and converted into heat at temperatures ranging from 70° F. to several thousand degrees F. The efficiency of conversion depends largely upon the difference in temperature between the absorbing surface and the surrounding environment and the type of solar collector which is utilized.

It is known in the art to employ a storage medium in a solar panel to allow for utilization of the solar energy during hours of darkness and when sunlight is unavailable because of cloud conditions. One form of energy transfer and storage medium is disclosed in U.S. Pat. No. 2,595,905 which issued May 6, 1952 to Maria Telkes. The referenced patent discloses a solar heater including a radiation absorbing cell containing a material having a substantial heat of fusion at a temperature above 50° F. Thus, during hours of sunlight, the radiation strikes the material converting it from a solid to a liquid state, the latter being a higher energy state, thereby storing a significant amount of energy. When sunlight is no longer present, the material will change from a liquid back to a solid and release its heat of fusion in the process. The Telkes patent discloses only the use of a material such as glauber's salt or other inorganic salt as the storage medium.

The difficulties with utilizing a material such as those disclosed in the referenced patent as a heat storage medium are several. The material has a high specific gravity requiring increased structural supports of significant size to support the solar panel if it is located on the roof of a building which is the preferable location. The material is also highly corrosive, thereby requiring substantial maintenance of the solar panel and related equipment. Another disadvantage of the material is its toxicity which, if a break in the system occurs, could be a health hazard. Materials of this type are also somewhat unstable requiring continual monitoring to be certain that physical separation or chemical changes have not occurred.

It is also known in the prior art to utilize a collector panel of some type of metal having a darkened surface to enhance heat absorption. While heat absorption is increased with a darkened surface, the heat can only be utilized after it is dissipated from the surface to the heat transfer medium. It has been found that, when a transparent solar cell is utilized, greater efficiency results than with the darkened cells of the prior art.

SUMMARY OF THE INVENTION

According to the teachings of the present invention, a transparent solar cell is utilized and the heat transfer medium is a paraffinic or aromatic hydrocarbon. Such a material has a relatively low specific gravity when compared with transfer mediums of the prior art, is non-toxic and non-corrosive yet still has a relatively high heat of fusion.

Accordingly, it is a primary object of the present invention to provide a heat transfer medium for solar cells which will be lighter in weight than previous heat transfer mediums, thereby reducing the structural requirements for supporting the solar cell.

It is also an object of the present invention to provide a heat transfer medium for solar cells which is non-corrosive in nature, thereby reducing the maintenance requirements for the solar cell.

An important aim of the invention is to provide a heat transfer medium for solar cells which is non-toxic, thereby eliminating any health hazard in the event of a break in the system, either during installation or use.

Still another important object of my invention is to provide a heat transfer medium for a solar cell which is chemically and physically stable for an indefinite period of time, thereby eliminating the need to replace the medium or to even monitor its condition.

It is another important objective of the invention to provide a solar cell having a substantially transparent pane thereby increasing the efficiency of the cell by permitting increased dirct transfer of solar energy from the solar radiation to the heat transfer medium.

Another object of the invention is to provide a solar cell with a pane which is transparent in nature to reduce the time required for dissipation of energy which reaches the cell through solar radiation.

Other objects of the invention will be made clear or become apparent from the following description and claims when read in light of the accomanying drawing, wherein:

DETAILED DESCRIPTION OF THE INVENTION

Figure 1:
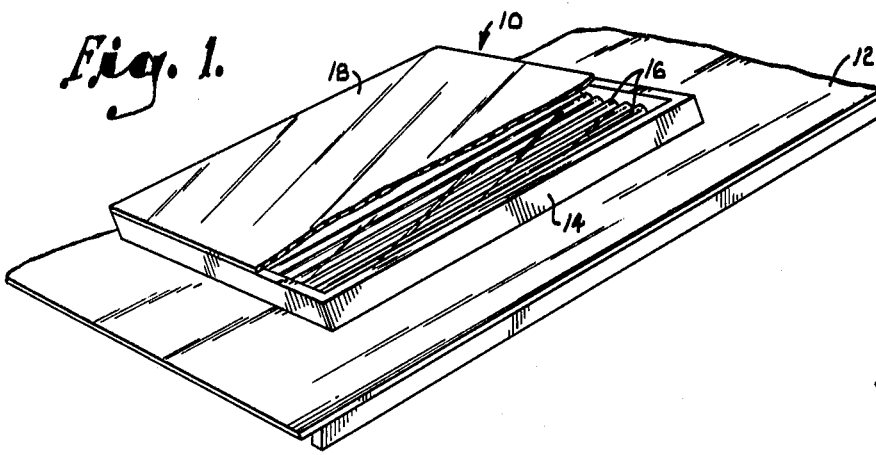
FIG. 1 is a perspective view of a solar panel constructed according to one form of the present invention.

Referring initially to FIG. 1, a solar panel constructed according to the present invention is designated generally by the numeral 10 and is disposed on the roof 12 of a bulding. In its simplest form, the solar panel 10 comprises a framework 14 having a plurality of tubular members 16 supported thereby in spaced relationship. Each of the tubes 16 contains a heat transfer and storage medium which will be described in greater detail hereinafter. Framework 14 and tubes 16 supported thereby are covered with a transparent cover panel 18 which serves to trap the heat from solar radiation within the panel 10.

Figure 2:
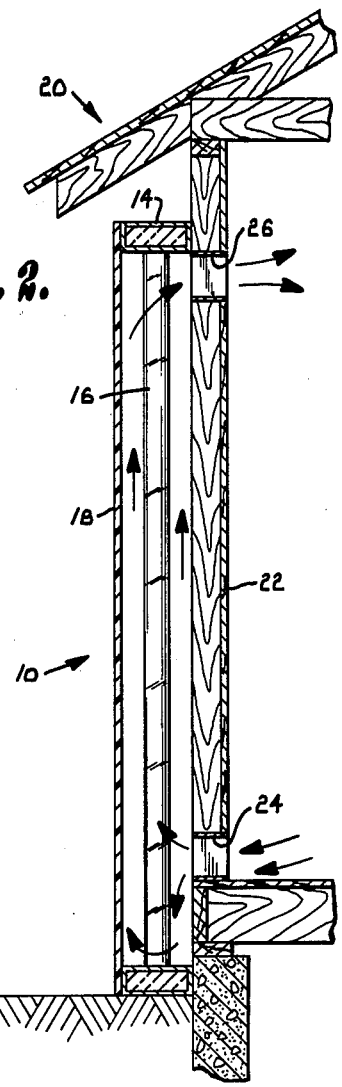
FIG. 2 is a vertical, cross-sectional view through a building showing a solar panel constructed according to the present invention.
Figure 3:
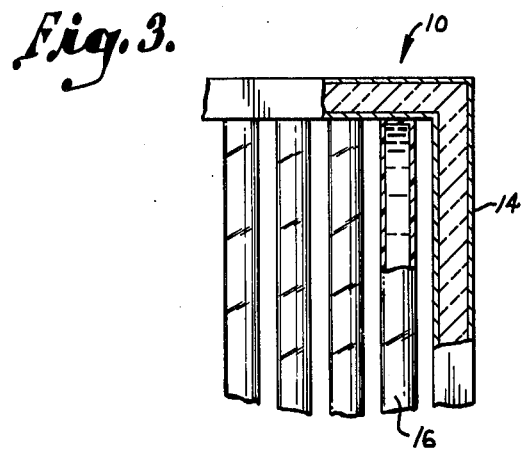
FIG. 3 is an enlarged fragmentary view, partially in cross-section, showing details of construction of the solar panel of FIG. 2.

Referring additionally to FIG. 2, a panel 10 is shown disposed at one side of a building 20 in contiguous relationship with a wall 22. An inlet opening 24 at the bottom of wall 22 permits the flow of air into panel 10 and a second opening 26 in the wall 22 provides an outlet for the air to return to the interior of the building.

The solar panel shown in FIGS. 1 and 2 represents the simplest form of the invention whereby air is used as the medium to transfer heat from the solar panel to the building being heated. The flow of air is indicated by the arrows in FIG. 2. It will be appreciated that in many installations, however, it will be desirable to employ water as the heat transfer medium or to utilize the solar panel as a hot water heater. In this situation, additional tubes would be passed through the solar panel and would be connected to headers at the top and bottom of the panel. The headers would in turn be insulated to minimize heat loss. The heated water would move upwardly as its temperature rises and pass from the solar panel either throughout the building to heat it or to a storage tank where the hot water can be utilized.

With the use of either air or water, as the heat transfer medium, the storage medium contained within tubes 16 comprises an important aspect of the present invention. The storage medium is preferably an organic material having a relatively high heat of fusion, within the range of from 50 to 170 B.T.U.'s per pound and a melting point of 50° F. or above but below the temperatures reached by sunlight striking the material in a container. Ideally, the storage medium will have a heat of fusion of at least 50 B.T.U.'s per pound. The storage medium of the present invention is an organic material with a specific gravity of less than 1 and is preferably selected from the group comprising $C_{15}$ to $C_{36}$ paraffinic hydrocarbons and $C_8$ to $C_{14}$ aromatic hydrocarbons. Examples of materials which can be used according to the present invention are: (paraffinic hydrocarbons) Pentadecane, Hexadecane, Heptadecane, Octadecane, Nonadecane, Eicosane, Heneicosane, Docosane, Tricosane, Tetracosane, Pentacosane, Heptacosane, Octacosane, Nonacosane, Triacontane, Hentriacontane, Tritriacontane, Tetratriacontane, Pentatriacontane, Hexatriacontane, 2-Methyltricosane and 2,2-Dimethyldocosane; (Aromatics): P-Xylene, Camphene, B-Methylnapthalene, Diphenyl, Diphenylmethane, Tolane and Dibenzil.

The melting points of the foregoing materials range from a low of 50° F. for Pentadecane to a high of 168° F. for Hexatriacontane. The foregoing materials generally have a relatively high heat of fusion in the order of approximately 100 B.T.U.'s per pound. The specific gravity of all of the materials is less than one. It may be desirable to incorporate a dye or other coloring medium of dark color in the storage medium to enhance its ability to absorb solar electromagnetic energy.

By utilizing the aforedescribed energy storage media, a method of storing solar energy may be practiced comprising the steps of providing a container for the storage medium, exposing the container with the storage medium contained therein to the sunlight to change the medium from a solid to a liquid state to thereby store the solar energy until such time as the liquid solidifies, releasing its heat of fusion. By utilizing the storage medium in conjunction with a solar panel as above described, an extremely efficient solar heating system is provided. By utilizing a transparent cover panel as part of the solar panel, solar radiation is transferred directly to the heat storage and transfer medium with greater efficiency than has heretofore characterized panels of darkened metal. While the absorption characteristics of the panel are somewhat reduced when compared with darkened metallic panels, the ability of the panel to transfer and diffuse the energy in a shorter period of time more than compensates for the reduced absorption.

Figure 4:
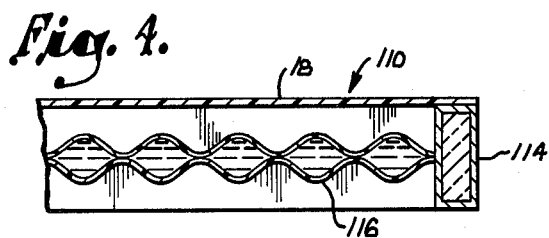
FIG. 4 is a fragmentary, cross-sectional view illustrating a modified form of the invention.

Referring additionally to FIG. 4 of the drawings, a modified panel construction is designated generally by the numeral 110 and comprises a framework 116 which supports a plurality of tubular members 116 wherein the tubular passages are of generally eliptical configuration and may be formed by welding or otherwise securing two corrugated members. Again, a transparent cover panel 18 is placed over the framework 116 to trap the heat within the panel after it strikes the storage and/or heat transfer medium.

Figure 5:
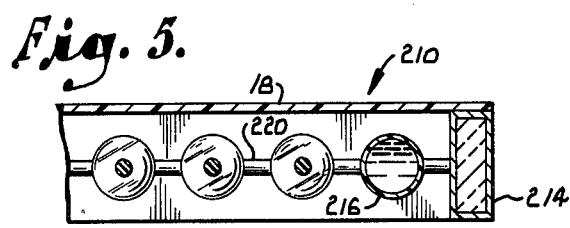
FIG. 5 is another fragmentary, cross-sectional view illustrating another modified form of the invention.

Still another alternative form of the invention is shown in FIG. 5 wherein the solar panel is designated generally by the numeral 210 and comprises a framework 214 which supports a number of spheres 216 containing the storage medium. Again, a transparent cover panel 18 is disposed over the framework 214. A gridwork 220 within framework 214 may be utilized to help support spheres 216.

It will be appreciated that with all of the embodiments of the invention, it is desirable to provide a glazing on the surfaces of coverplate 18 to enhance absorption of radiation and retention of heat inside of the panel. In this regard, it should be understood that, after the solar radiation strikes the storage medium and/or the heat transfer medium within the solar panel, the wave length of the radiation will be increased sufficiently so as to greatly reduce the amount of energy escaping back through plate 18 as compared with the amount of energy entering the place from the outside.

From the foregoing description, it will be appreciated that I have invented a medium for the storage of solar energy as well as a method of storing solar energy and a novel solar energy panel meeting all of the objectives as herein set forth.

Having thus described the invention, I claim:

1. A method of storing solar energy comprising the steps of:
   providing a liquid container;
   placing in said container an organic material having a relatively high heat of fusion and a melting point of between 50° F. and 168° F. and selected from the group consisting of $C_{15}$ to $C_{36}$ paraffinic hydrocarbons and $C_8$ to $C_{14}$ aromatic hydrocarbons; and
   exposing said material in said container to the sunlight thereby changing said material from a solid to a liquid state whereby to store the solar energy in the liquid until such time as the liquid solidifies releasing the heat of fusion.

2. A method as set forth in claim 1 wherein the step of placing an organic material in said container comprises placing a material having a heat of fusion of at least 35 BTU/lb.

3. A method as set forth in claim 2 wherein said placing step comprises placing in said container a material having a heat of fusion of from 50 to 170 BTU/lb.

4. A method as set forth in claim 2 wherein said placing step comprises placing in said container a material having a specific gravity of less than one (1).

5. A method as set forth in claim 2 wherein the step of providing a container comprises providing a container having a pane of translucent material.

6. A method as set forth in claim 5 wherein the step of providing a container comprises providing a container having a pane of substantially transparent material.

7. A solar energy panel comprising: a container having a translucent pane and adapted to be mounted to receive solar radiation; and a heat transfer medium disposed in said container, said medium being characterized by a relatively high heat of fusion and a melting point of between 50° F. and 168° F. and selected from the group consisting of $C_{15}$ to $C_{36}$ paraffinic hydrocarbons and and $C_8$ to $C_{14}$ aromatic hydrocarbons.

8. A device as set forth in claim 7 wherein said pane comprises a substantially translucent object.

9. A device as set forth in claim 7 wherein said organic material has a heat of fusion of at least 35 BTU/lb.

10. A device as set forth in claim 7 wherein said organic material has a heat of fusion of from 50 to 170BTU/lb.

11. A device as set forth in claim 7 wherein said organic material has a specific gravity of less than one (1).

* * * * *